(12) United States Patent
Campbell et al.

(10) Patent No.: US 11,143,489 B2
(45) Date of Patent: Oct. 12, 2021

(54) RAIL-LAUNCHING MUNITION RELEASE

(71) Applicant: Raytheon Company, Waltham, MA (US)

(72) Inventors: David R. Campbell, Indianapolis, IN (US); Philip C. Wright, New Palestine, IN (US); Robert A. Bailey, Avon, IN (US); James Traylor, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 177 days.

(21) Appl. No.: 16/269,620

(22) Filed: Feb. 7, 2019

(65) Prior Publication Data

US 2020/0200506 A1    Jun. 25, 2020

Related U.S. Application Data

(60) Provisional application No. 62/627,243, filed on Feb. 7, 2018.

(51) Int. Cl.
*F41F 3/04* (2006.01)

(52) U.S. Cl.
CPC .................................. *F41F 3/0406* (2013.01)

(58) Field of Classification Search
CPC .................................................... F41F 3/0406
See application file for complete search history.

(56) References Cited

U.S. PATENT DOCUMENTS

| | | | |
|---|---|---|---|
| 3,742,813 A | 7/1973 | Kongelbeck | |
| 4,313,582 A * | 2/1982 | Hasquenoph | B64D 7/08 244/137.4 |
| 4,429,611 A * | 2/1984 | Oldham | F41F 3/06 89/1.816 |
| 4,444,087 A * | 4/1984 | Hunter | F41F 3/077 89/1.802 |

(Continued)

FOREIGN PATENT DOCUMENTS

| | | |
|---|---|---|
| DE | 3446452 | 7/1986 |
| EP | 0296010 | 12/1988 |
| WO | 2013014229 | 1/2013 |

OTHER PUBLICATIONS

International Search Report and Written Opinion for corresponding International Application No. PCT/US2019/016969 dated Jul. 31, 2019.

*Primary Examiner* — Michelle Clement

(74) *Attorney, Agent, or Firm* — Renner, Otto, Boisselle & Sklar, LLP

(57) ABSTRACT

A rail launch mechanism and method for launching a payload is configured to release payload lugs of a payload from a platform. A rack for launching a payload includes multiple rails that separately engage lugs in the respective payload of the rails, and a force actuator for launching the payload by accelerating the payload along the rails, causing the lugs to separate from the respective rails. A launching system for launching the payload from the platform may include a rail, at least one payload release shoe that carries a payload lug along the rail, and a force actuator for accelerating the payload release shoe such that inertia of the payload causes the payload lug to be released from the payload release shoe.

16 Claims, 11 Drawing Sheets

(56) References Cited

U.S. PATENT DOCUMENTS

| | | | | |
|---|---|---|---|---|
| 4,825,151 A | * | 4/1989 | Aspelin | F41G 7/001 |
| | | | | 102/206 |
| 4,870,885 A | * | 10/1989 | Grosselin | B64D 1/04 |
| | | | | 89/1.819 |
| 4,922,799 A | * | 5/1990 | Bartl | B64D 1/06 |
| | | | | 244/137.4 |
| 4,926,740 A | * | 5/1990 | Griffin | B64D 7/08 |
| | | | | 89/1.58 |
| 5,094,140 A | * | 3/1992 | Williams | F41F 3/06 |
| | | | | 89/1.806 |
| 6,125,734 A | * | 10/2000 | Yagla | F41F 3/042 |
| | | | | 89/1.8 |
| 6,250,195 B1 | | 6/2001 | Mendoza et al. | |
| 8,091,460 B2 | * | 1/2012 | Hainze | F41F 3/0406 |
| | | | | 89/1.806 |
| 8,887,613 B1 | * | 11/2014 | Griffin | F41F 3/0406 |
| | | | | 89/1.806 |
| 2011/0167995 A1 | * | 7/2011 | Goasduff | B63G 1/00 |
| | | | | 89/1.819 |

* cited by examiner

RAIL-LAUNCHING MUNITION RELEASE

FIELD OF THE INVENTION

The invention relates to payload release mechanisms and methods of carriage and releasing payloads.

DESCRIPTION OF THE RELATED ART

Various applications may use deployable payloads that are releasable from a stationary or moving platform. For example, military applications that use land vehicles, aircrafts, surface ships, or underwater vehicles may include deployable munitions. In an aircraft application, munitions are conventionally dropped vertically such that the carriage of the munitions is restricted to locations of the airframe of the aircraft that are under wing hardpoints, fuselage hardpoints, or bomb bays having doors that face downwardly. However, conventional launching devices may not be suitable for use in applications that do not have conventional launching platforms such as wing hardpoints. Additionally, an aircraft with doors arranged in the sides or rear of the fuselage may not be suitable for utilizing conventional vertical launching devices.

Deploying the unpowered munition may include using a horizontal rail launcher that is attached to the airframe and supports the munition during carriage. Conventional attachment points on the munition include lugs that are supported in a single rail. However, conventional rail launchers are disadvantageous in that a rear lug may disengage from the rail before the front lug, resulting in binding in the rail and a nose-up pitch rotation of the payload, while also imparting unintended angular momentum to the payload. Another disadvantage of conventional rail launchers is that the conventional rail launcher may not be adaptable for different types of payloads, such as different munitions.

Additionally, rail mechanisms for deploying powered munitions have been used for rocket and missile launchers. However, these devices may not be suitable for launching from many locations of a vehicle because of the rocket blast that impinges upon the vehicle, equipment, or passengers.

Prior attempts to improve the release of munitions from a platform include a method in which the munition is pushed out of a cargo bay on pallets that are pulled by drogue shoots. However, using the drogue shoots is disadvantageous in that the method does not occur rapidly, requires a lot of manual handling, and does not permit precision timing for releasing the payload within a tight release window. Another disadvantage is that the method may not be suitable for releasing larger quantities of munitions. Another prior attempt includes explosively and pneumatically accelerating small munitions out of launching tubes from cargo bays. However, this method may not be suitable for use with different types of munitions or larger munitions.

SUMMARY OF THE INVENTION

The rail launching mechanisms described herein enables more controlled and accurate launching of a payload as compared with conventional rail launching systems. An exemplary dual rail launching mechanism includes vertically offset rails that separately engage payload lugs of the payload. Arranging the rails to be vertically offset provides a horizontal, or nearly horizontal, launching arrangement in which either a simultaneous release of the payload lugs from the rails occurs, or a controlled disengagement of each lug occurs. Simultaneously disengaging the payload lugs from the rail or disengaging the payload lugs with a predetermined delay between the lug disengagement enables the orientation of the payload in a carriage position to be maintained when moving to a release position in which the payload is to be launched. Accordingly, binding in the rail and tipping or tumbling of the payload is prevented and a greater accuracy of the payload is ensured as the payload separates consistently at the desired pitch angle such that unintended angular momentum being imparted to the payload is prevented.

The dual rail launching mechanism includes a force actuator that is arranged to provide a linear acceleration force that is aligned with a rail and one of the payload lugs for launching of the payload. Arranging a force actuator, such as a piston, in-line with the upper rail enables the acceleration forces to be aligned with the force actuator such that the overall length of the force actuator may be reduced. Arranging the launching mechanism to launch horizontally and reducing the overall length of the launching mechanism enables the launching mechanism to be accommodated in limited spaces that may not have previously been utilized for launching systems, such as in a fuselage of an aircraft. Still another advantage of the dual rail launching mechanism is that horizontal launching results in reaction loads occurring in a horizontal direction of the vehicle in which the dual rail launching mechanism is arranged, such as a sea, land, air, or hypersonic vehicle. Since aircraft wings are generally stronger in a longitudinal direction of the body of the vehicle, horizontal launch from a wing station will result in the vehicle enduring less wing deflection and flutter. Additionally, the launcher is configured to horizontally launch in the aft direction from a craft operating at high speed in water or air because the payload can be directed into the wake of the craft rather than pushing the payload through the turbulent boundary layer or shock wave.

Another exemplary rail launching mechanism includes a payload release shoe that is attachable between a rail and the payload lug of any suitable payload. The payload release shoe may be used in the dual rail launching mechanism and each rail may include a shoe connected to the corresponding payload lug. The payload release shoe is configured to retain the payload lug when carrying the payload. The payload release shoe is also used to release the payload lug when the payload reaches an end of the rail by way of inertia of the payload. The payload release shoe has a blocking piece that is pivotable relative to a hook of the payload release shoe. When the payload release shoe is accelerated to the end of the rail and the blocking piece is free to rotate, the hook abruptly engages against an end stop of the rail, the motion of the hook is ceased and the inertia of the payload causes the payload lug to slide off of the hook and push against the blocking piece to enable the payload lug and payload to be released from the payload release shoe. The rail launching mechanism is advantageous in that the payload release shoe self-opens at the end of the rail and the shoe is easily adaptable with standard payload lugs that are attached to existing payloads.

According to an aspect of the invention, a rail launching mechanism may include dual rails that separately engage payload lugs of a payload.

According to an aspect of the invention, a rail launching mechanism may include multiple rails and a force actuator that is linearly aligned with one of the rails.

According to an aspect of the invention, a rail launching mechanism includes multiple rails that are offset relative to each other.

According to an aspect of the invention, a rail launching mechanism may include at least one payload release shoe that enables standard payload lugs to be accommodated by the rail launching mechanism.

According to an aspect of the invention, a rack for launching a payload includes multiple rails that separately engage payload lugs received in respective of the rails, and a force actuator for launching the payload by accelerating the payload along the rails, causing the payload lugs to separate from the respective rails.

According to an embodiment of any paragraph(s) of this summary, the rails are parallel and offset from one another in a perpendicular direction relative to a length of the rack.

According to an embodiment of any paragraph(s) of this summary, the rails are offset by a distance between 2 and 13 centimeters.

According to an embodiment of any paragraph(s) of this summary, the force actuator is in-line with one of the rails and offset relative to another one of the rails.

According to an embodiment of any paragraph(s) of this summary, the rails have a stepped arrangement that ascends along a length of the rack opposite the force actuator.

According to an embodiment of any paragraph(s) of this summary, the rack includes a frame having a base, wherein the multiple rails are offset relative to the base and the force actuator is in-line with one of the rails which is farther away from the base relative to another one of the rails.

According to an embodiment of any paragraph(s) of this summary, the rails are vertically offset and the payload is horizontally ejected from the rack.

According to an embodiment of any paragraph(s) of this summary, the rails each have a length that is less than a distance between the payload lugs.

According to an embodiment of any paragraph(s) of this summary, the force actuator includes a telescoping piston and a ramrod that is engaged by the telescoping piston.

According to an embodiment of any paragraph(s) of this summary, the force actuator includes at least one of an electrical actuator, a pneumatic actuator, a hydraulic actuator, or an explosive actuator.

According to an embodiment of any paragraph(s) of this summary, the rack includes at least one payload release shoe that is connected between one of the payload lugs and one of the rails, and an inertia of the payload causes the payload lug to be released from the at least one payload release shoe.

According to an embodiment of any paragraph(s) of this summary, the at least one payload release shoe includes a blocking piece and a hook that define a lug-retaining recess for the payload lug, with the hook being hinged to the blocking piece for opening the lug-retaining recess to release the payload lug.

According to an embodiment of any paragraph(s) of this summary, the rack includes a stop shoulder arranged at an end of a length of the rail, such that the hook is engageable against the stop shoulder and the blocking piece is hinged for pivoting relative to the hook on an opposing side of the stop shoulder.

According to an embodiment of any paragraph(s) of this summary, the rack includes a plurality of payload release shoes, wherein each of the rails includes a payload release shoe.

According to an embodiment of any paragraph(s) of this summary, a launching system includes the rack according to claim and further includes a plurality of racks that are vertically stacked.

According to an embodiment of any paragraph(s) of this summary, the launching system includes an electronic control unit that is configured to control each of the racks independently relative to other racks.

According to another aspect of the invention, a launching system for launching a payload from a platform includes a rail, at least one payload release shoe that is configured to carry a payload lug along the rail, and a force actuator for accelerating the at least one payload release shoe, wherein an inertia of the payload causes the payload lug to be released from the at least one payload release shoe.

According to an embodiment of any paragraph(s) of this summary, the at least one payload release shoe includes a blocking piece and a hook that define a lug-retaining recess for the payload lug, with the hook being hinged to the blocking piece for opening the lug-retaining recess to release the payload lug.

According to an embodiment of any paragraph(s) of this summary, the launching system includes a stop shoulder arranged at an end of a length of the rail, and the hook is engageable against the stop shoulder and the blocking piece is hinged for pivoting relative to the hook on an opposing side of the stop shoulder.

According to another aspect of the invention, a method of horizontally launching a payload from a rail mechanism includes separately engaging payload lugs in a respective rail of multiple rails that are vertically offset, providing an accelerating force to the payload lug engaged in an upper rail to accelerate the payload along the dual rail mechanism, and disengaging the payload lugs from the multiple rails.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have particular application in launching systems that are suitable for use in various applications. Suitable applications may include land vehicles, aircrafts, surface ships, underwater vehicles, and hypersonic vehicles that are configured to launch a payload. In addition to powered and unpowered air-to ground payloads, or stores, air-to-ground rockets or air-to-air missiles may be suitable applications. Exemplary applications may be military applications or commercial applications using military craft or commercial craft such as commercial planes, cargo planes, helicopters, balloons, and other aerostats for delivery of payloads. Many different types of launching platforms may be suitable and the platforms may be manned or autonomous. Examples of launchable payloads include munitions, underwater vehicles, flares, chaff, drones, and any other non-lethal effectors or cargo (e.g., medical supplies, food, emergency kits, humanitarian goods, etc.) that may be launched from a platform.

Figure 1:
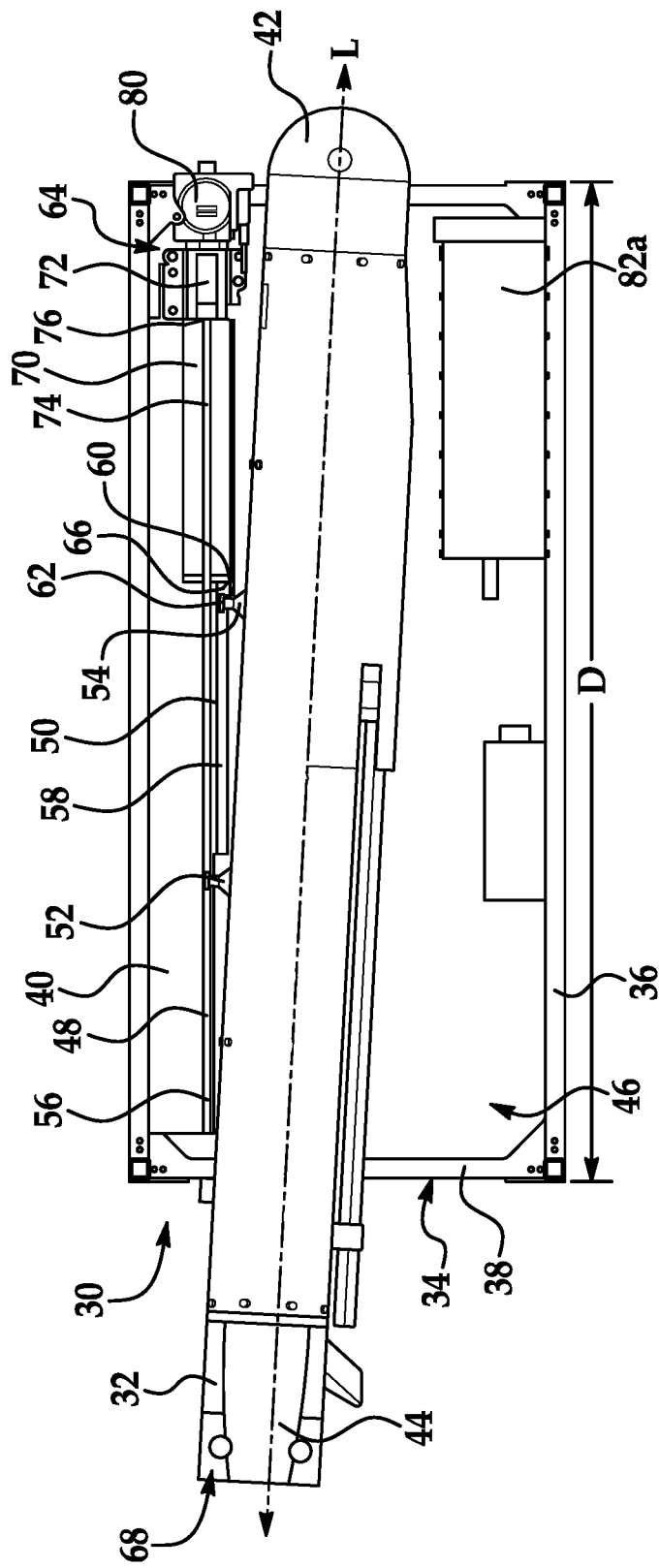
FIG. 1 is a drawing showing a side view of a rack having a dual rail according to an exemplary embodiment of the present application, in which the rack supports a payload in a carriage position.
Figure 3:
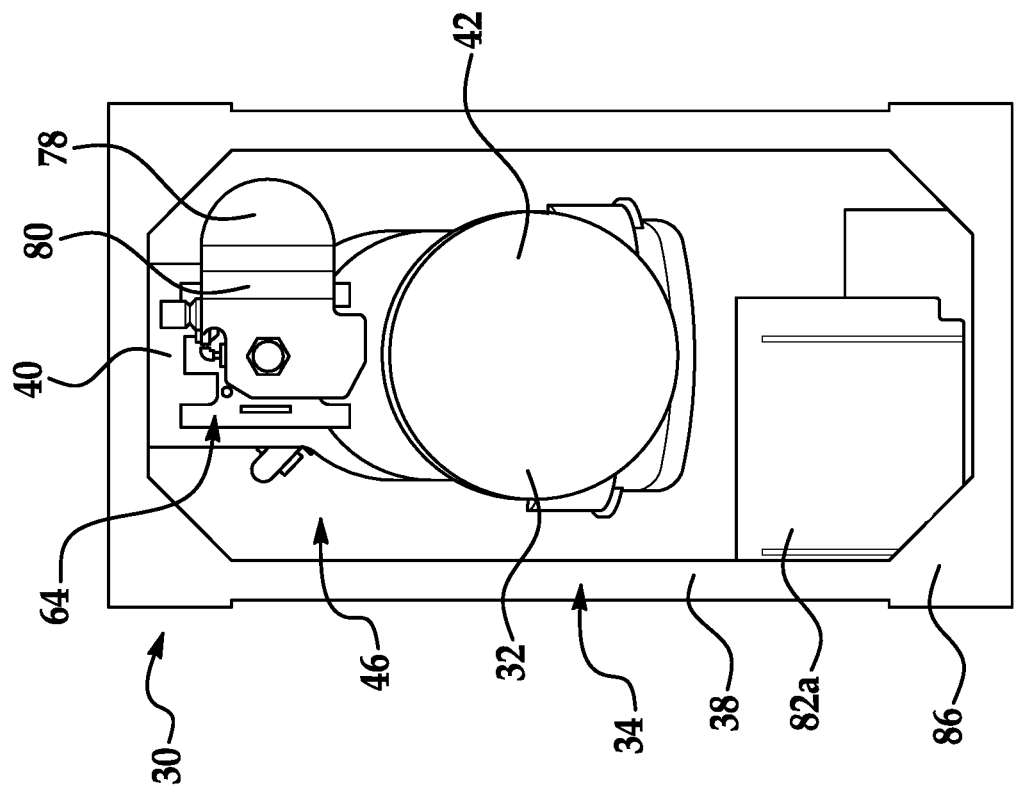
FIG. 3 is a drawing showing an opposite end view of the rack of FIG. 2.
Figure 2:
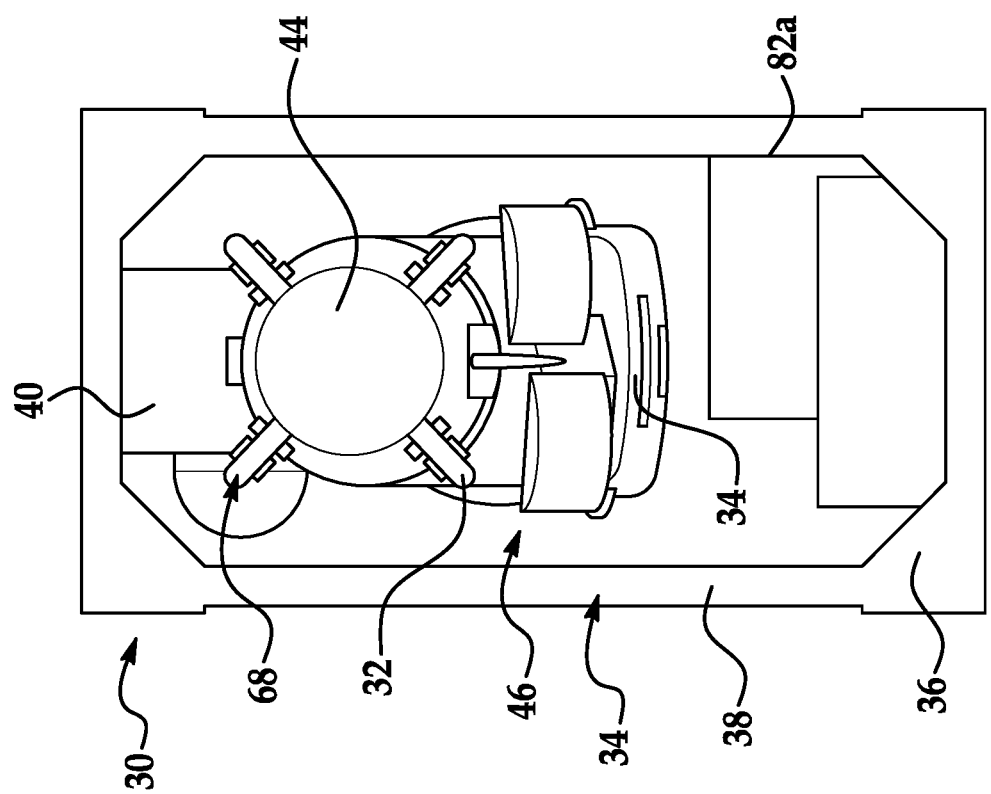
FIG. 2 is a drawing showing an end view of the rack of FIG. 1.

Referring first to FIGS. 1-4, a rack 30 for horizontally launching a payload 32 is shown. A frame 34 of the rack 30 includes a base 36 that is attachable to a platform, such as a land vehicle, aircraft, or underwater vehicle. At least one support post 38 or multiple support posts extend from the base 36 to support at least one rail 40 that is arranged substantially parallel with the base 36. The frame 34 may have any suitable shape and size for accommodating the payload 32. For example, the frame 34 may have a rectangular shape that is defined by four support posts extending perpendicular to the base 36 along edges of the frame 34. The payload 32 be in the form of any suitable launchable payload or effector having any size or shape. The size and shape of the payload 32 may be dependent on the application or mission. In an exemplary application, the payload 32 may have a cylindrical body with a forward end 42, as best shown in FIG. 3, and an aft end 44, as best shown in FIG. 2. The body of the payload 32 may be at least partially supported within an open volume 46 that is defined by the frame 34.

Figure 4:
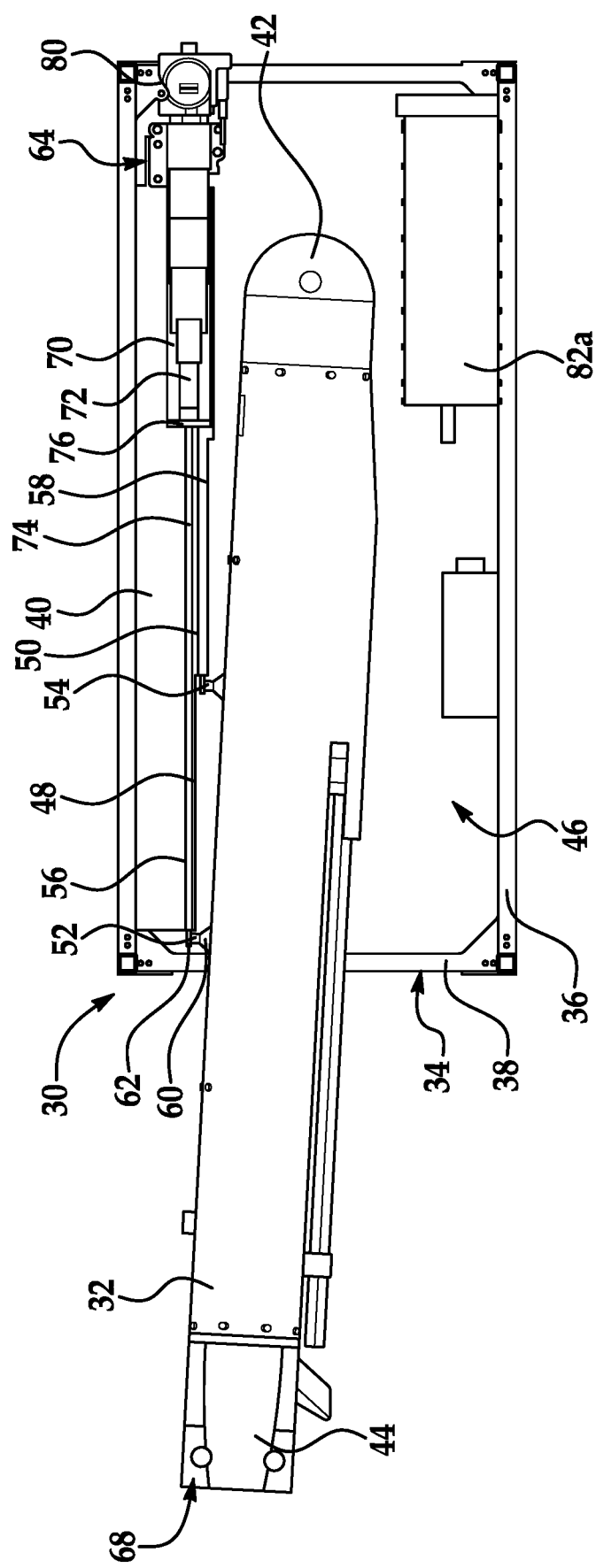
FIG. 4 is a drawing showing a side view of the rack of FIG. 1 when the payload supported by the rack is in a release position.

The rail 40 may be formed integrally with the frame 34 or the rail 40 may be separately formed and attachable to the frame 34. The frame 34 includes more than one rail 40 or multiple rails 48, 50, as best shown in FIGS. 1 and 4. The frame 34 and rails 48, 50 may be formed of any suitable material such as metal materials. Aluminum, steel, and titanium may be suitable materials. Any suitable number of rails may be provided and in an exemplary embodiment, the frame 34 may include a dual rail assembly having rails 48, 50. The rails 48, 50 are configured to separately engage attachment lugs or payload lugs 52, 54 that are formed on or attached to the payload 32. The payload lugs 52, 54 may be any protrusion that is formed on or attached to the body of the payload 32. The payload lugs 52, 54 are used to mechanically couple the payload 32 to another structure, such as in a launching system. The payload lugs 52, 54 are configured to mechanically couple the payload 32 to the rails 48, 50 and may remain attached to the payload 32 when the payload 32 is launched from the launching system.

Two or more payload lugs 52, 54 may be provided on the payload 32, such as two payload lugs 52, 54 that are axially aligned along the longitudinal body of the payload 32. The payload lugs may include a rear payload lug 52 that is proximate the aft end 44 of the payload 32 and a forward payload lug 54 that is proximate the forward end 42 of the payload 32. The payload lugs 52, 54 may have any suitable shape or body portion that is configured to be engageable in grooves 56, 58 of the rails 48, 50. The rear payload lug 52 is movable through the groove 56 of the rail 48 and the forward payload lug 54 is movable through the groove 58 of the rail 50. Each of the payload lugs 52, 54 may have a lug body 60 that is attached to an exterior surface of the body of the payload 32 and an engaging portion 62 that is received in the corresponding groove 56, 58 and moveable along the corresponding groove 56, 58. The engaging portion 62 may be flat such that the engaging portion 62 rests on a bottom lip of the groove 56, 58. The lug body 60 may extend from the engaging portion 62 of the payload lug 52, 54 through an open bottom of the groove 56, 58 to the payload 32.

The rails 48, 50 are parallel and offset relative to each other. The rails 48, 50 are offset in a direction perpendicular to a length D of the rack 30. The rails 48, 50 are arranged adjacently and form a stepped arrangement along the length D of the rack 30. Each rail 48, 50 may have a length that is approximately the same and slightly less than a distance between the payload lugs 52, 54. The length of the rails 48, 50 may be variable, and the rails 48, 50 may be extendable or retractable to adjust the length. The rails 48, 50 may be separated by between 5 and 13 centimeters (or approximately 2 and 5 inches) and each rail 48, 50 may have a length that is between approximately 17 centimeters (or approximately 7 inches) and approximately 9.5 meters (or approximately 30 feet), depending on the application, to give a broad range of suitable lengths. The length of each rail 48, 50 may be dependent on a desired velocity or acceleration of the payload 32. Longer lengths of the rails may correspond to larger accelerations and velocities of the payload 32. The rails 48, 50 and the rack 30 may be formed of any suitable material, such as a metal material, for example steel, aluminum, or titanium. Any suitable manufacturing process or combination of processes may be used to form the rack, including casting, molding, machining, joining, and additive manufacturing.

The rack 30 includes a force actuator 64 that is arranged adjacent the rails 48, 50 along the length D and in communication with at least one of the rails 48, 50 for launching the payload 32 by accelerating the payload 32 along the rails 48, 50. The stepped arrangement of the rails 48, 50 may ascend along the length D opposite the force actuator 64. The rails 48, 50 may be offset in a vertical direction relative to the base 36 such that an upper rail 48 is farther from the base 36 as compared with a lower rail 50. The force actuator 64 is in-line or linearly aligned with (in this case) the upper rail 48 and the rear payload lug 52 such that the force actuator 64 is configured to provide a force that is aligned with the force actuator 64 and the upper rail 48.

The payload 32 has a carriage position in which the payload 32 is carried by the rack 30, as shown in FIG. 1, and a release position in which the payload lugs 52, 54 are disengaged from the rails 48, 50 and the payload 32 is released, as shown in FIG. 4. The payload 32 remains in the carriage position during movement of the platform and until the payload 32 is launched. As shown in FIG. 1, when in the carriage position, the forward payload lug 54 closest to the forward end 42 of the payload 32 is retained within the groove 58 of the lower rail 50 and the rear payload lug 52 closest to the aft end 44 of the payload 32 is retained within the groove 56 of the upper rail 48. When in the carriage position, the payload 32 may be maintained in a slight nose down pitch angle orientation.

When the payload 32 is in the carriage position, each of the payload lugs 52, 54 may be arranged at an end of the respective groove 56, 58 that is proximate the force actuator 64. When the payload 32 moves from the carriage position toward the release position, the payload lugs 52, 54 move in a direction away from the force actuator 64 toward the aft end 44 of the payload 32. Each of the payload lugs 52, 54 may engage against an end wall 66 defining an end of the respective rail 48, 50. When in the carriage position, the aft end 44 of the payload 32 may extend outwardly from the frame 34 such that a propulsion or guidance device 68 of the payload 32 located at the aft end 44 is arranged outside the volume 46 defined by the frame 34. The payload 32 may have any suitable propulsion or guidance device 68, such as a propeller, and the propulsion device 68 may be dependent on the application. For example, in an underwater application, the propulsion device 68 may include a water jet thruster.

Figure 5:
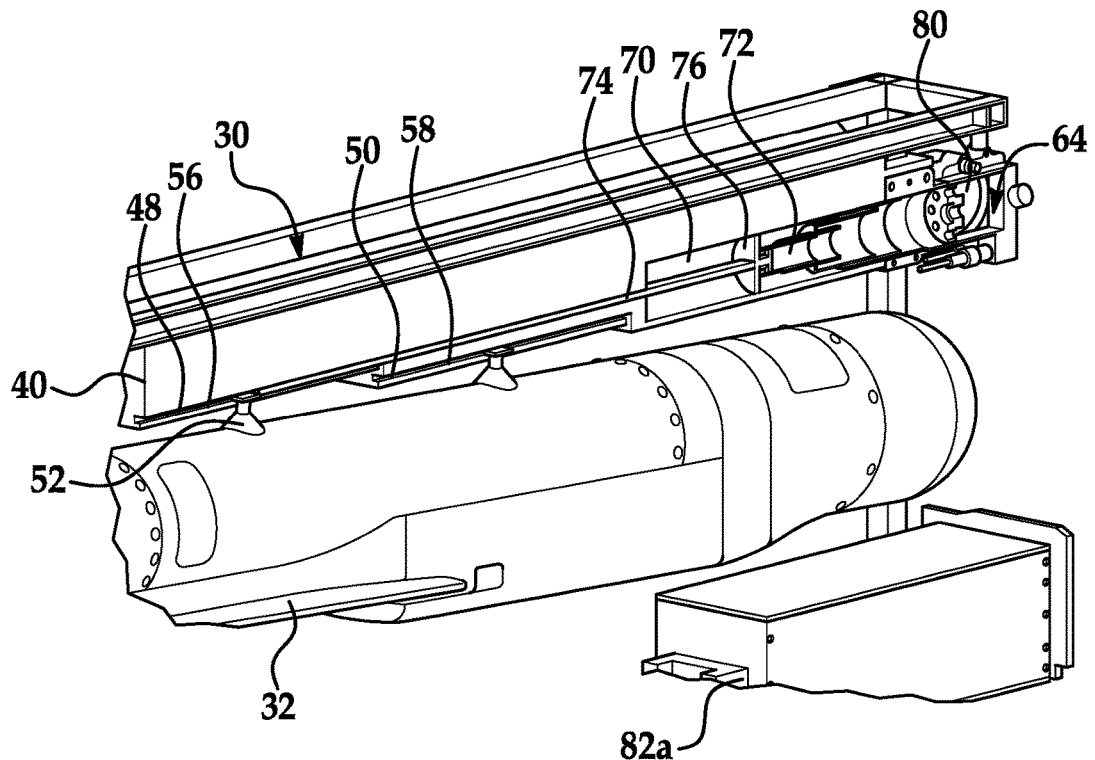
FIG. 5 is a drawing showing an oblique view of the rack of FIG. 4 when the payload is moving from the carriage position to the release position.
Figure 6:
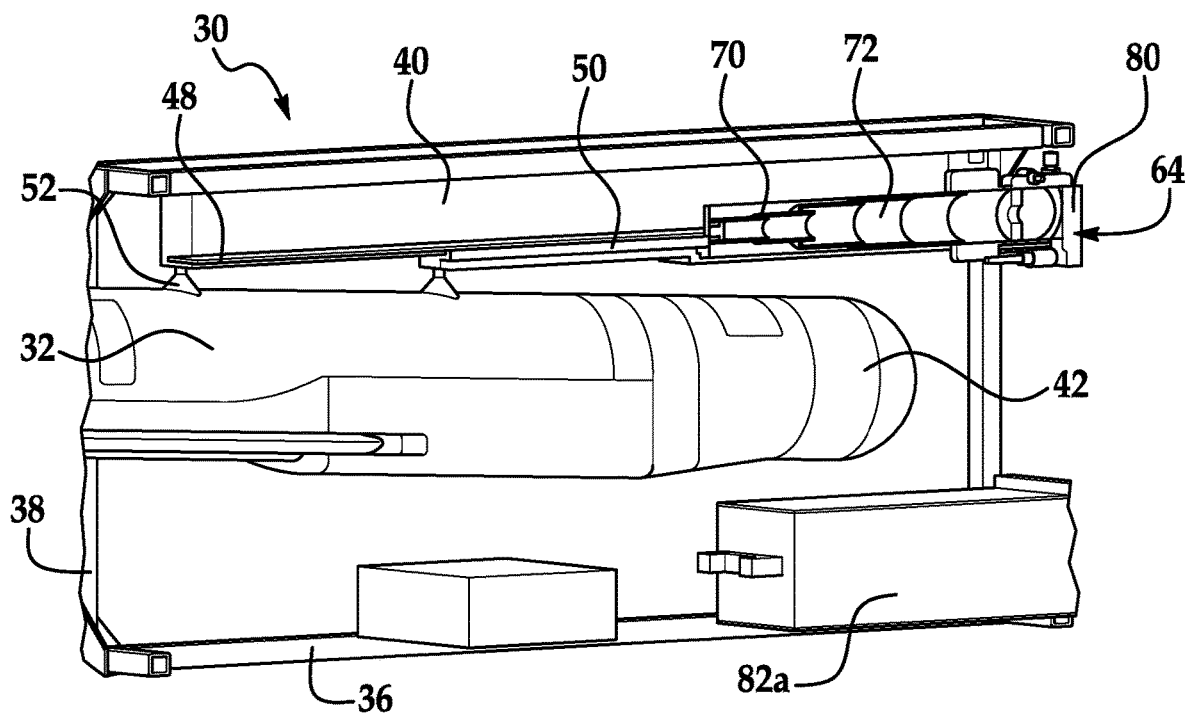
FIG. 6 is a drawing showing an oblique view of the rack of FIG. 3 and details of a force actuator of the rack.
Figure 7:
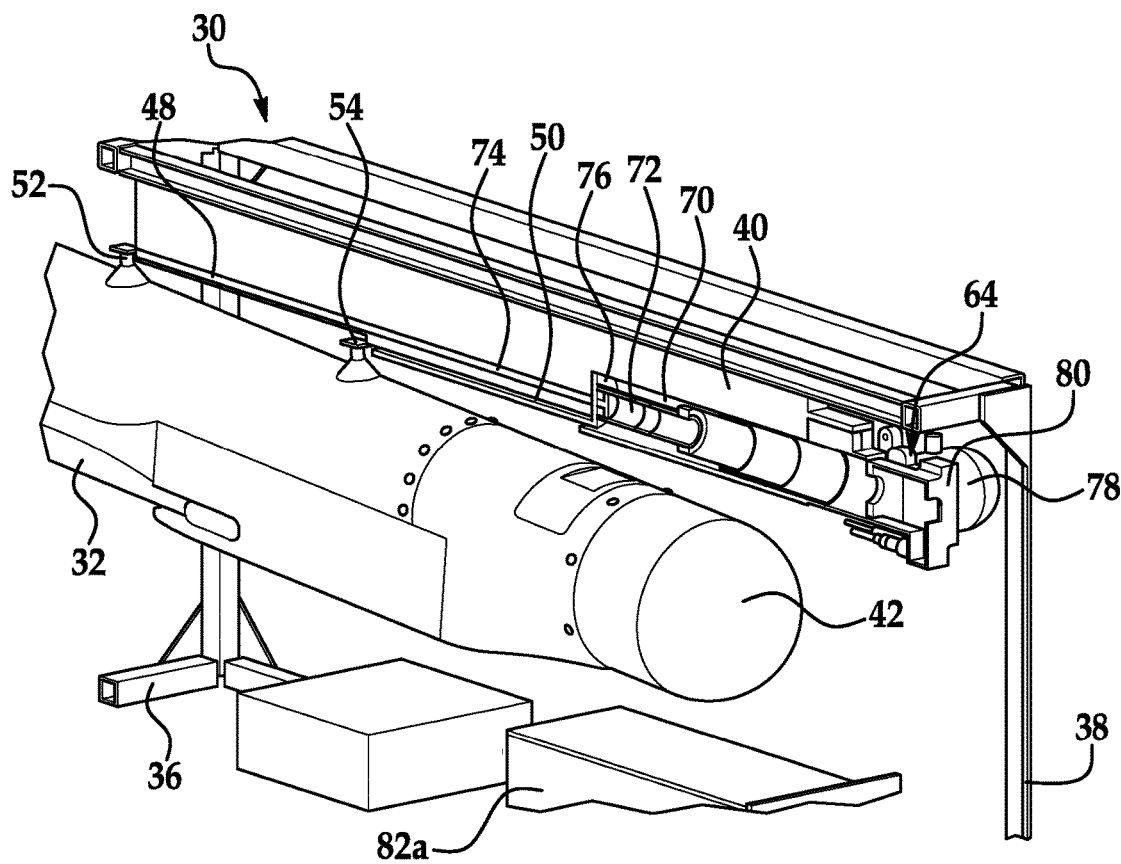
FIG. 7 is a drawing showing another oblique view of the rack of FIG. 6 and details of the force actuator.

Referring in addition to FIGS. 5-7, when a launch sequence for the payload 32 is initiated and the force actuator 64 is actuated, the payload 32 moves from the carriage position to the release position when accelerated by the force actuator 64. FIG. 5 shows an initial release position of the payload 32 in which the payload lugs 52, 54 are moved away from the end wall 66 of the respective rail 48, 50 toward an open end of the rail 48, 50. The force actuator 64 is in communication with the rear payload lug 52 for pushing or accelerating the rear payload lug 52 along the upper rail 48. Movement of the rear payload lug 52 simultaneously causes corresponding movement of the payload 32 and the forward payload lug 54 along the lower rail 50.

When the rear payload lug 52 reaches the open end of the rail 48, the rear payload lug 52 "falls off" or disengages from the groove 56. Due to the lengths of the rails 48, 50 being slightly less than a distance between the payload lugs 52, 54, the forward payload lug 54 may simultaneously reach the open end of the rail 50 and the forward payload lug 54 disengages from the groove 58 at the same time as the rear payload lug 52. In other exemplary embodiments, the lengths of the rails 48, 50 may be selected for enabling disengagement of the payload lugs 52, 54 at different times. After the payload 32 has been completely disengaged from the rails 48, 50, the payload 32 is in the release position and is arranged in a slight nose down pitch angle orientation and may be actuated for movement toward a target. The movement of the payload 32 may occur in the forward direction of the payload 32 which is opposite to the direction in which the accelerating force of the force actuator 64 is applied to the rear payload lug 52.

Using the vertically offset dual rails 48, 50 is advantageous in that the payload lugs 52, 54 may be disengaged from the rack 30 simultaneously in an exemplary embodiment. For example, simultaneous disengagement of the payload lugs 52, 54 from the rails 48, 50 may be considered to occur when the payload lugs 52, 54 are disengaged from the respective rail 48, 50 within a time span of around one millisecond. In exemplary embodiments, the time span may be several milliseconds. In other exemplary embodiments, the disengagement of the payload lugs 52, 54 may not occur simultaneously and the rails 48, 50 may be configured to control the disengagement of the payload lugs 52, 54. The rails 48, 50 may be configured to enable disengagement of either the rear payload 52 first or the forward payload 54 first, and to obtain a desired delay between disengagement of the payloads 52, 54.

The arrangement of the force actuator 64 is advantageous in that the force actuator 64 is configured to provide an accelerating force that is in-line with the upper rail 48 and the rear payload lug 52 for horizontal launching of the payload 32. In contrast, in a single rail, the payload lugs 52, 54 are in-line with each other and the accelerating force is in-line with both payload lugs 52, 54 such that the rear lug 52 would fall off the rail before the forward payload lug 54 causing binding on the forward payload lug 54 and an uneven release of the payload. Simultaneously disengaging the payload lugs 52, 54 from the rack 30 enables an even release of the payload 32 with no tip-off effect such that the accuracy of the payload 32 will be improved.

The dual rail launching mechanism is further advantageous in that the launching may occur in the forward or rear direction of the payload 32, and the payload 32 may be ejected in a horizontal or nearly horizontal direction regardless of whether the payload 32 is in a nose down, horizontal, or tail down orientation. The payload 32 may be considered to be ejected in a nearly horizontal direction if the trajectory of the payload 32 is within 15 degrees of the axis from which the payload 32 is initially ejected. Horizontally launching the payload 32 is advantageous in that the payload 32 is more efficiently separated from an aircraft and the payload 32 more easily penetrates a boundary layer of air. Additionally, horizontally launching the payload 32 provides aircraft reaction loads that occur in a longitudinal direction of the aircraft which is advantageous since aircraft structures are generally stronger in a longitudinal direction. Thus, less deflection and flutter may occur if the reaction loads occur in the longitudinal direction of the aircraft. In hypersonic or supersonic applications, using the dual rail launching mechanism may be advantageous in avoiding the impacts of shockwaves.

Using the vertically offset rails and linearly aligned motive force also enables the payload lugs 52, 54 to have the same size and the same height such that the payload 32 may be arranged in different orientations within the rack 30, such as forward end first or aft end first, which may be desirable for different applications. In contrast, a conventional single rail system may use taller lugs having a height that is equivalent to the radius of the force actuator, or piston, such that the force acts on the center of the lug. Using a tall lug may be disadvantageous in causing additional drag of the payload after launch. Still another advantage is that the overall length of the dual rail rack is reduced as compared with conventional single-rail racks or rail mechanisms. In an aircraft application, for example, reducing the length of the rack enables the horizontal launch of a payload, such as a munition, from inside a fuselage, under a fuselage, under a wing or other aircraft locations that were previously unfeasible for accommodating a launching mechanism.

The force actuator 64 is arranged for movement in a motive force tube 70 that is in communication with the upper rail 48 for providing a motive force to accelerate the rear payload lug 52 along the upper rail 48. Any suitable drive mechanism may be used. Examples of suitable drive mechanisms include electrical actuators, pneumatic actuators, hydraulic actuators, or explosive actuators and the force actuator 64 may include any suitable arrangement of valves, springs, drive motors, or other components. An exemplary force actuator 64 includes a telescoping piston 72 that is axially expandable and extendable through the motive force tube 70 and a ramrod 74 that is engageable between a piston head 76 of the telescoping piston 72 and the rear payload lug 52. Extended positions of the telescoping piston 72 are shown in FIGS. 4-7. The force actuator 64 further includes a pneumatic container 78, as shown in FIGS. 3 and 7, and a quick release valve 80 that is in communication with the pneumatic container 78 and a control system of the platform. As the telescoping piston 72 is pressurized and extends axially outwardly, the ramrod 74 pushes the rear payload lug 52 along the rail 48 toward the open end of the rail 48.

Figure 8:
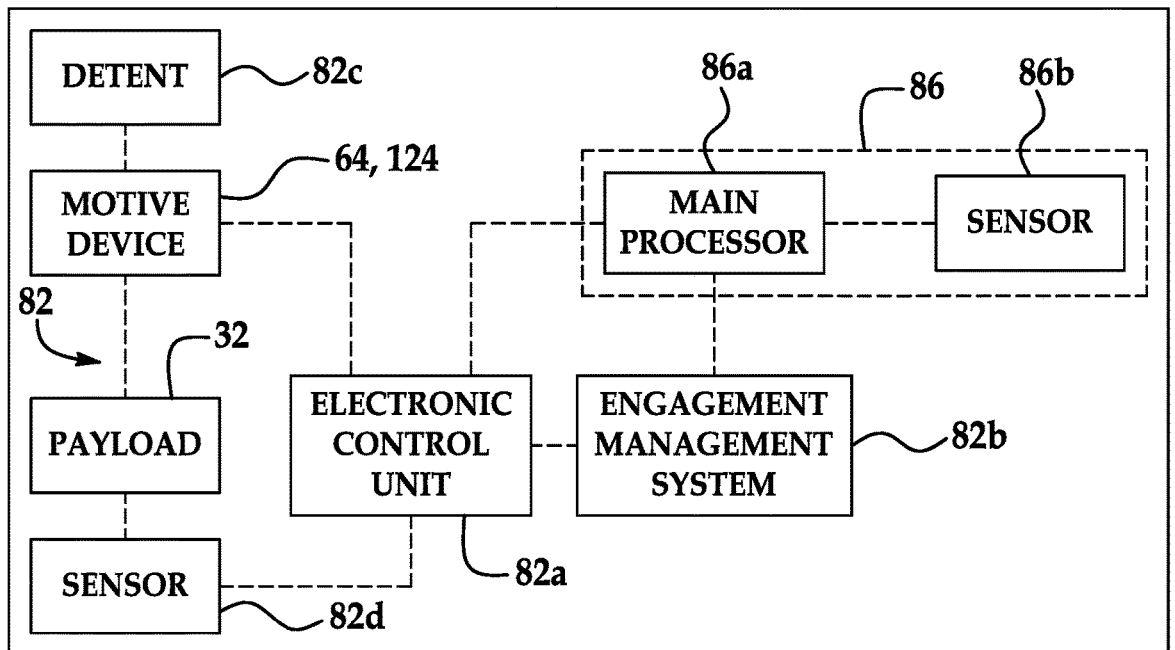
FIG. 8 is a drawing showing a control system for the rack of FIG. 1.

Referring now to FIG. 8, an exemplary rack control system 82 for the rack is shown. The rack control system 82 may be self-contained and is configured for integration with a platform 84 to which the rack 30 is attached, such as an aircraft having an existing main control system 86. The rack control system 82 may include any suitable control box or electronic control unit 82a, as also shown in FIGS. 1-7. The electronic control unit 82a is in communication with the release valve 80 and an engagement management system 82b of the rack control system 82 which may include any suitable processor and memory which is configured for storing data, such as various launch or mission sequences of the payloads. In an exemplary application, the engagement management system 82b may be configured for any suitable function such as payload initialization, payload deployment control, payload employment, and mission management. When integrated with the platform 84, the engagement management system 82b and the electronic control unit 82a may each be in communication with a main processor 86a of the main control system 86 of the platform 84. The main processor 86a may include any suitable processor and memory for storing data pertaining to operation of the platform 84. Using the rack control system 82 is advantageous in that the rack 30 and the rack control system 82 are suitable for integration into many different platforms without manipulation of the already existing main control system 86 and corresponding platform electronics.

The main control system 86 may further include any suitable sensor 86b and other systems that are part of the already existing platform 84, such as a tracking system, navigation system, or situational awareness displays. The existing platform systems and sensors may be dependent on whether the platform is manned, unmanned, or autonomous. Examples of suitable sensors include position, speed, and acceleration sensors, optical sensors, acoustic or sound sensors, environmental sensors, flow or fluid velocity sensors, and navigation sensors. Pressure sensors, density sensors, thermal sensors, proximity sensors, time-of-travel sensors, range sensors, and radar sensors may also be suitable. For example, a proximity or radar sensor may be used to detect the proximity of the platform 84 relative to a desirable object or target. The aforementioned types of sensors are merely exemplary and many other types of sensors may be suitable. Exemplary systems may include systems configured for target detection, threat detection, a global positioning system, radar detection system, or any other suitable detection system for location information. For example, in an exemplary application in which a desired target is detected by the sensor 86b, the main processor 86a may receive and process the data and communicate with the engagement management system 82b to activate the electronic control unit 82a and the release valve 80 of the force actuator 64 to initiate a launch sequence of the payload 32.

The rack control system 82 may further include a lock or detent mechanism 82c that is incorporated on the actuator 64 and may prevent unintended launching of the payload 32. Any suitable detent mechanism may be used and the detent may be include mechanical blocking-type device, electrical switches, solenoids, springs, other suitable devices and any combination thereof. The detent mechanism may be a stop that is dislodged at the end of the rails 48, 50 to prevent the payload lugs 52, 54 from disengaging from the rails 48, 50. The detent mechanism 82c may be released from the payload 32, such as electrically, prior to launching via communication with the electronic control unit 82a. The rack control system 82 may further include at least one sensor 82d for the payload 32 that is configured for communication with the electronic control unit 82a such that the electronic control unit 82a controls the detent mechanism 82c in response to the sensor 82d. The sensor 82d may be a velocity sensor or acceleration sensor such that if the payload 32 does not reach a predetermined velocity or acceleration at a point along the rail 48, 50, the detent mechanism 82c may remain in a locked state preventing release of the payload lugs 52, 54.

In exemplary embodiments, the rails 48, 50 may be configured to retract the payload lugs 52, 54 along the rails 48, 50 if the payload 32 is not launchable. If the payload 32 reaches the predetermined velocity or acceleration, the detent mechanism 82c may be moved to an unlocked state which enables the release of the payload lugs 52, 54. Additionally, the rails 48, 50 may include a sway-brace which provides alignment of the payload 32 and centers the payload 32 along the rails 48, 50. The sway-brace may be released from the payload 32 before the payload 32 is accelerated along the rails 48, 50.

Figure 9:
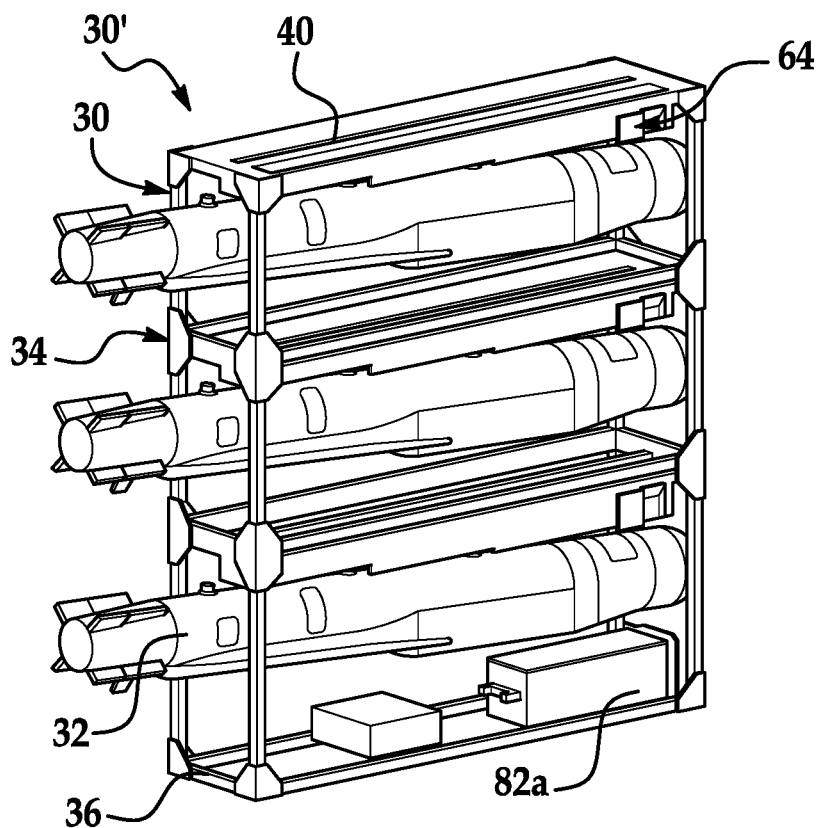
FIG. 9 is a drawing showing an oblique view of a rack assembly having a plurality of the racks of FIG. 1.
Figure 10:
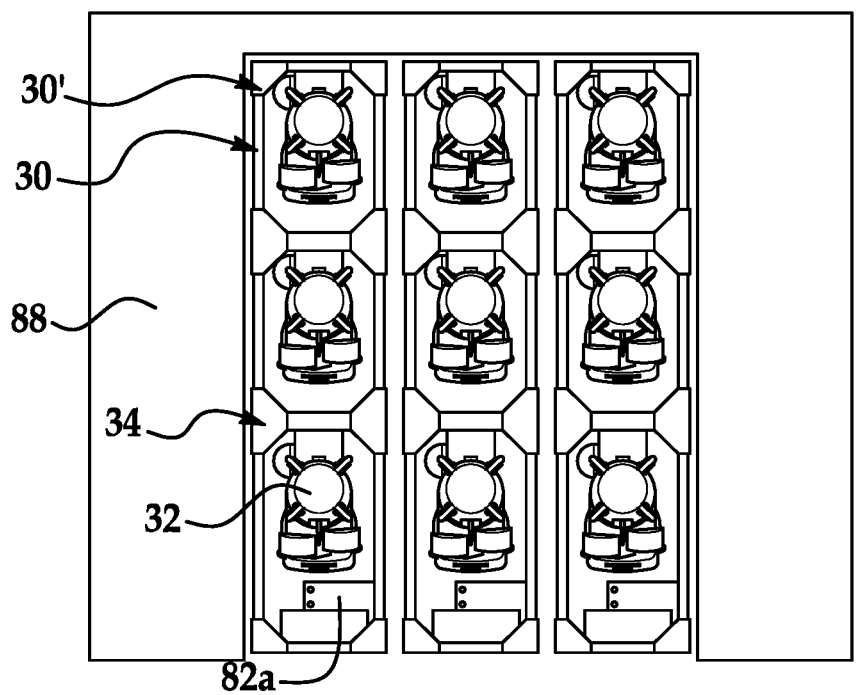
FIG. 10 is a drawing showing an end view of a cargo bay having a plurality of the rack assemblies of FIG. 9.
Figure 11:
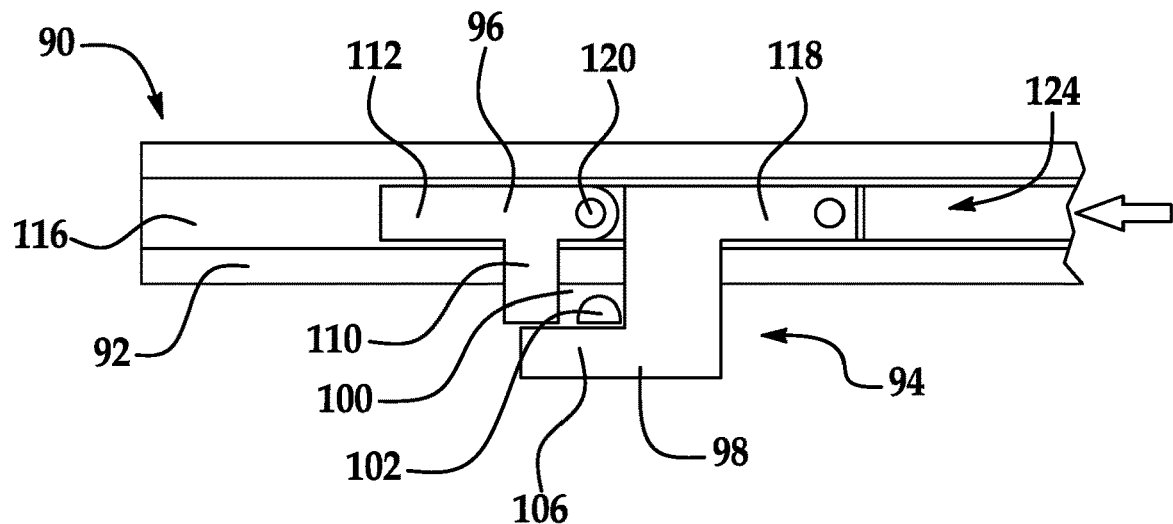
FIG. 11 is a drawing showing a side view of a rail launching release mechanism according to an exemplary embodiment of the present application, in which a payload release shoe is in a blocking position.
Figure 12:
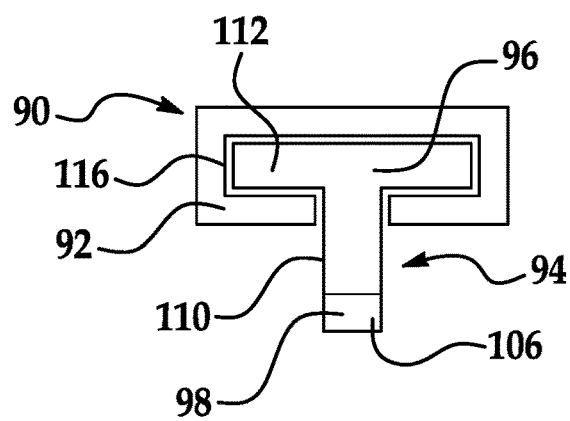
FIG. 12 is a drawing showing an end view of the rail launching release mechanism of FIG. 11.

Referring now to FIGS. 9 and 10, an exemplary rack assembly 30' is shown which includes a plurality of racks 30 having features that are in accordance with the rack 30 as previously described. The racks 30 are vertically stacked and each of the racks 30 is configured to support a payload 32. Any suitable number of racks may be vertically stacked and the racks and payloads of each rack may be arranged parallel and in-line with each other. Each rack 30 may be separately formed and attachable to another rack such that the rack assembly 30' is modular and reconfigurable for different applications and space accommodations. In other exemplary applications, the rack assembly 30' may be formed as a single and integral unit with parallel rails. The racks may be assembled into groups for launching out of large cargo bay doors, or in other exemplary applications, individual racks may launch out of smaller doors. Each rack 30 may be movable or detachable within an accommodating space, such as inside of an aircraft fuselage, enabling the removal of empty rails after launching and the replacement of the empty rails with loaded rails.

The rack assembly 30' is operable by the control system 82 shown in FIG. 8 and may have a single electronic control unit 82a that is in communication with the force actuator 64 of each rack 30 arranged in the rack assembly 30'. Each rack 30 may be independently controlled in response to commands and sensed conditions of the surrounding environment, such as those of an aircraft. Using the control system 82 to control the rack assembly 30' is advantageous in that the rack assembly 30' is precisely controllable. The engagement management system 82b may also be configured for controlling the rack assembly 30' such that the rack assembly 30' may be suitable for simultaneous launching of the payloads or a sequential launching of the payloads, depending on the application. FIG. 9 shows an exemplary application in which more than one rack assembly 30' is provided and the rack assemblies are arranged in aligned columns and rows. The rack assemblies may be arranged in a cargo bay 88 of a platform. As shown in FIG. 9, using the rack 30 enables accommodation of multiple payloads within the cargo bay 88.

Referring now to FIGS. 11-17, a rail launching mechanism 90 for horizontally launching a payload is shown. The rail launching mechanism 90 includes a rail 92 attached to a launching platform and at least one payload release shoe 94 that is configured to carry a payload (not shown) along the rail 92. The payload may be similar to the payload 32 shown in FIGS. 1-7. The rail 92 may be a single rail. In other exemplary embodiments, the payload release shoe 94 may be suitable for use with the dual rail launching system shown in FIGS. 1-7, such that each rail 48, 50 may have a corresponding payload release shoe 94. Using the payload release shoe 94 along with the dual rail launching system may be particularly advantageous in controlling the disengagement of payload lugs from the rail mechanism. Using the payload release shoe 94 with the dual rail launching system is further advantageous in that the shoe enables many different types of payload lugs to be compatible with the dual rail launching system. For example, in addition to custom payload lugs that are formed and shaped for engagement with the rails 48, 50, conventional or standard payload lugs may also be mechanically coupled to the rails 48, 50 using the payload release shoes 94.

Figure 13:
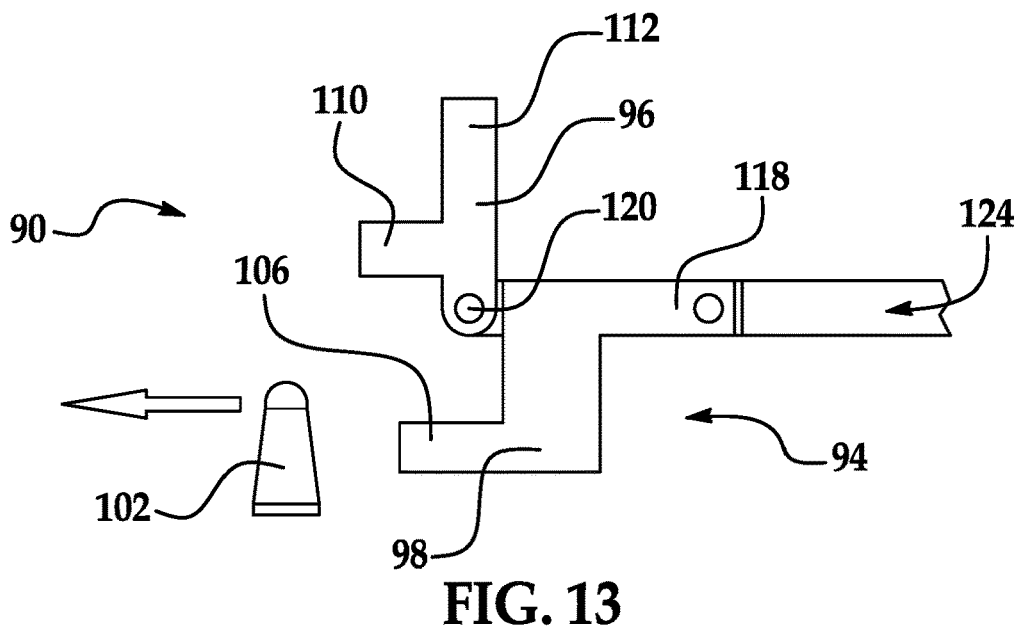
FIG. 13 is a drawing showing a side view of the payload release shoe of FIG. 11 when in a release position.
Figure 16:
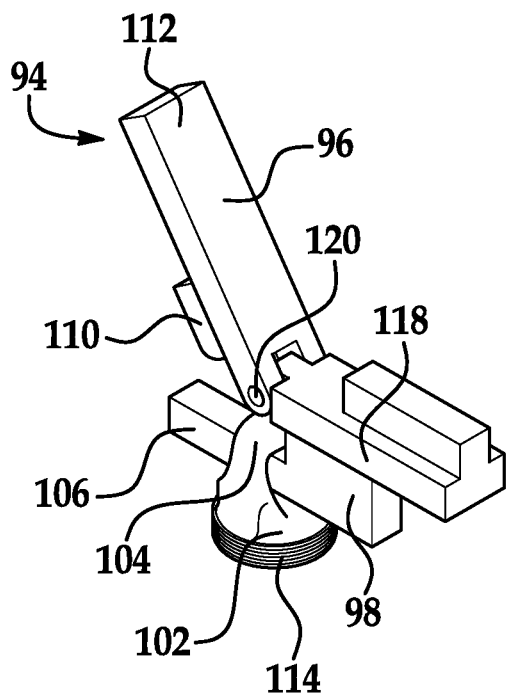
FIG. 16 is a drawing showing an oblique view of the payload release shoe and a payload lug of the rail launching release mechanism of FIG. 14.
Figure 17:
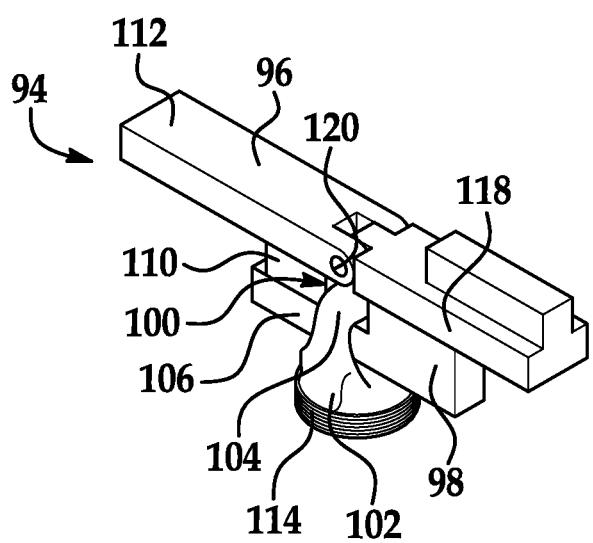
FIG. 17 is a drawing showing an oblique view of the payload release shoe and the payload lug on the rail launching release mechanism of FIG. 15.

The payload release shoes 94 are configured to be moveable between a blocking position, such as during travel of a platform, and a release position in which the payload is released, such as during a launch sequence. Each payload release shoe 94 includes a blocking piece 96 and a hook 98 that is hinged to the blocking piece 96. The blocking piece 96 is pivotable between a blocking position, as shown in FIGS. 11, 12, 14 and 16, and a release position, as shown in FIGS. 13, 15 and 17. The blocking piece 96 and the hook 98 define a lug-retaining recess 100 that retains a payload lug 102 attached to a payload. The payload may have a carriage position in which the payload is carried by the payload lug 102 along the rail 92 and a release position in which the payload is disengaged and released from the rail 92.

The payload lug 102 may include an eyebolt having an upper loop 104, as best shown in FIGS. 14-17. The upper loop 104 may extend across the body of the payload lug 102 and rest on a flat base 106 of the hook 98 when the payload is in the carriage position and the upper loop 104 is received in the lug-retaining recess 100. The blocking piece 96 may have an arm 110 that engages against the flat base 106 to enclose the lug-retaining recess 100. The arm 110 may be formed as part of an L-shaped body of the blocking piece 96 and a leg 112 of the blocking piece 96 may extends perpendicular to the arm 110 and away from the lug-retaining recess 100. The hook 98 may have a Z-shaped body in which the flat base 106 forms a bottom leg of the Z-shaped body. The arm 110 of the blocking piece 96 may extend perpendicular to engage the flat base 106 when in the blocking position. The rail 92 and the payload release shoe 94 may be formed of any suitable materials. Metals such as aluminum, steel, and titanium may be suitable. Any suitable manufacturing process or combination of processes may be used to form the rail launching mechanism 90, including casting, molding, machining, joining, and additive manufacturing.

The payload may have more than one payload lug 102 and each payload lug 102 may be attachable and detachable relative to the payload using any suitable attachment mechanism. For example, the payload lug 102 may have a threaded portion 114 that is threadedly engageable with a corresponding threaded portion on the payload for securing the payload lug 102 to the body of the payload. In exemplary embodiments, each payload lug may have a corresponding payload release shoe 94 that is arranged along the single rail 92. In other exemplary embodiments, more than one rail may be provided such that each payload lug and release shoe 94 may correspond to a single rail.

The rail 92 has a groove 116 in which the blocking piece 96 and the hook 98 are engageable and slidable to move the payload along the rail 92. The groove 116 may have any suitable shape and the hook 98 may have a shape that is complementary in shape to the groove 116. The groove 116 may have a T-shaped cross-section and the hook 98 may have an upper engaging portion 118 that has a corresponding T-shaped cross-section, as best shown in FIGS. 16 and 17. The upper engaging portion 118 may be seated on the rail 92 and slideable along the rail 92. The groove 116 may have an open bottom such that the arm 110 of the blocking piece 96 and the body portion of the hook 98 extend through the open bottom out of the groove 116. The upper engaging portion 118 and the leg 112 may extend in-line and adjacent with each other along the rail 92 when the payload release shoe 94 is in the blocking position. Enabling the payload release shoe 94 to extend outwardly from the rail 92 ensures that the payload lugs and payload are easily attachable to the payload release shoe and moveable without interference with the rail 92.

Figure 14:
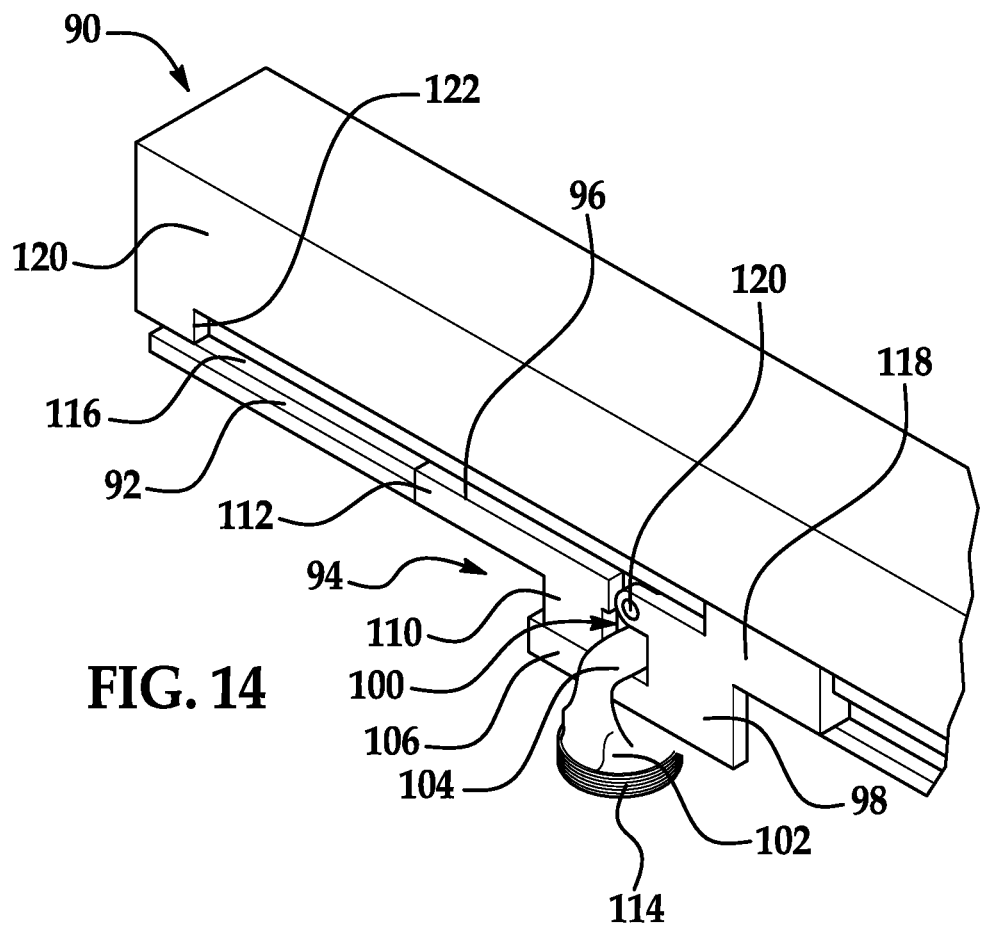
FIG. 14 is a drawing showing an oblique view of the rail launching release mechanism of FIG. 11.
Figure 15:
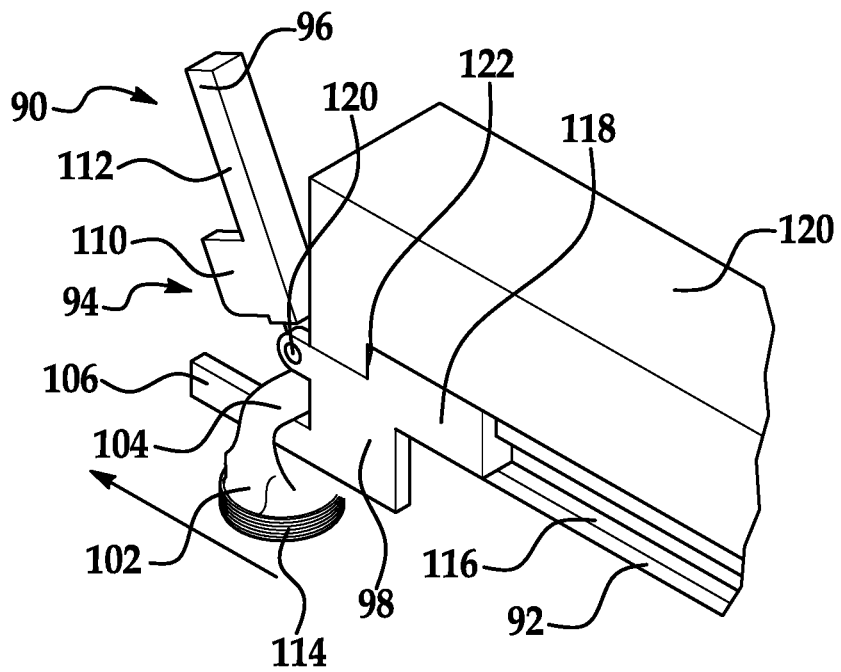
FIG. 15 is a drawing showing an oblique view of the rail launching release mechanism of FIG. 13.

As best shown in FIGS. 14 and 15, the rail launching mechanism 90 includes a frame member 120 which supports the rail 92. The frame member 120 may be a top part of the frame 34 as shown in FIGS. 1-4. The frame member 120 defines a stop shoulder 122 at an end of a length of the groove 116. The stop shoulder 122 extends perpendicularly from a main body of the frame member 120 and is engageable by the upper engaging portion 118 of the hook 98 when the payload release shoe 94 reaches the end of the rail 92. A hinged portion 120 of the blocking piece 96 that is connected to the upper engaging portion 118 of the hook 98 is arranged above the lug-retaining recess 100 and enables the arm 110 of the blocking piece 96 to pivot upwardly and away from the flat base 106 of the hook 98, opening the lug-retaining recess 100.

When the hook 98 reaches the end of the rail 92 and abruptly engages against the stop shoulder 122 on a groove side of the stop shoulder 122, the blocking piece 96 slides under the stop shoulder 122 and extends past the stop shoulder 122 and the end of the frame member 120. The top of the hinged portion 120 is then exposed and the blocking piece 96 is pivoted out of the blocking position on an opposing side of the stop shoulder 122. The upper portions of both the hook 98 and the blocking piece 96 are trapped in the T-shaped groove 116 by the frame member 120 to prevent the pivoting movement of the blocking piece 96 until the blocking piece 96 exits the end of the rail 92 and the blocking piece 96 is free to pivot and release the payload lug 102.

The payload release shoe 94 is pushed or accelerated by a force actuator 124 of the rail launching mechanism 90 that accelerates the payload release shoe 94 to a predetermined velocity or acceleration in an ejection direction of the rail 92. The inertia of the moving payload causes the payload to be released from the payload release shoe 94 by way of the upper engaging portion 118 of the hook 98 abruptly engaging or halting against the stop shoulder 122 and the payload lug 102 sliding off the flat base 106 of the hook 98. The sliding movement of the payload lug 102 causes the payload lug 102 to push against the arm 110 of the blocking piece 96, pivoting the blocking piece 96 out of the blocking position and opening the lug-retaining recess 100. The payload is then disengaged form the rail 92 and released from the rail launching mechanism 90.

Using the payload release shoe 94 is advantageous in that the shoe can easily be arranged between an existing payload lug of a payload and the corresponding rail. The retention function of the payload release shoe 94 ensures that the payload lugs remain captive during carriage and acceleration of the payload, and are not released until the payload reaches the end of the rail. In exemplary embodiments, multiple payload release shoes may be used to enable a simultaneous release of payload lugs to improve the accuracy of the payload. In various applications, the payload release shoe may be used to disengage rear and forward payload lugs at the same time, the rear lug before the forward lug, or the forward lug before the rear lug. Using the rail launching mechanism 90 may also be advantageous in that the rail launching mechanism 90 enables horizontal launching of the payload such that the rail launching mechanism 90 may be accommodated in unconventional spaces, such as those within an aircraft.

The force actuator 124 used to accelerate the payload release shoe 94 may include any suitable force actuator as previously described with regards to the force actuator 64 shown in FIGS. 1-9. For example, the force actuator 124 may include a telescoping piston and a ramrod that is engageable with the upper engaging portion 118 of the hook 98 for moving the payload release shoe 94 along the rail 92. Any suitable control system may be used for actuating the force actuator 124, such as the exemplary control system 82 shown in FIG. 8. For example, the force actuator 124 may be in communication with the electronic control unit 82a for control of the force actuator 124 in response to environmental conditions and system commands.

Figure 18:
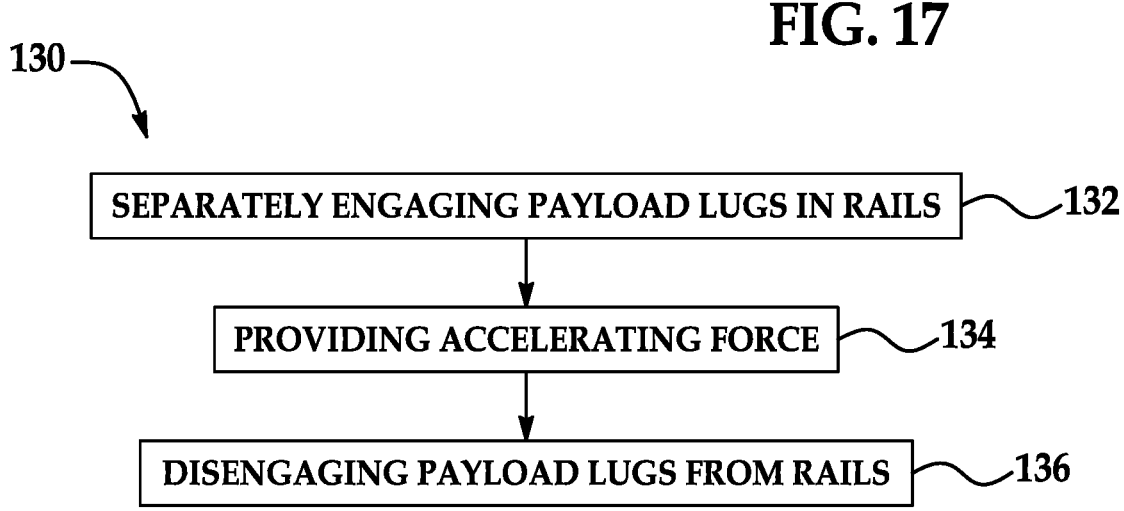
FIG. 18 is a drawing showing a flow chart of a method of manufacturing a rail launching system for horizontally launching a payload.

Referring now to FIG. 18, a method 130 of horizontally launching a payload using a rail launching system is schematically shown. The rail launching system may include any of the rail launching systems described herein. The first step 132 of the method 130 includes separately engaging payload lugs in a respective rail of multiple rails that are vertically offset, such as the payload lugs 50, 52 engaged in the rails 48, 50, as shown in FIGS. 1-4. The second step 134 of the method 130 includes providing an accelerating force to the payload lug 52 engaged in an upper rail 48 to accelerate the payload 32 along the dual rail mechanism, as shown in FIGS. 1-4. The third step 136 of the method 130 includes disengaging the payload lugs 50, 52 from the multiple rails 48, 50.

FIGS. 19-23 show exemplary applications or platforms in which the rack assembly 30' (shown in FIGS. 9 and 10) may be used. The rack assembly 30' includes racks 30 (shown in FIGS. 1-7) in accordance with the features described herein. The racks 30 may include the rail launching mechanism 90 having payload release shoes 94 connected between the payload lugs and the rails (shown in FIGS. 11-17). The types of payloads used in each application may be dependent on the application. For example, the platforms shown may be used in military applications or in commercial and other non-lethal applications. The racks 30 may be mounted externally to the platforms or the racks 30 may be arranged internally within the main bodies or frames of the platforms.

Figure 19:
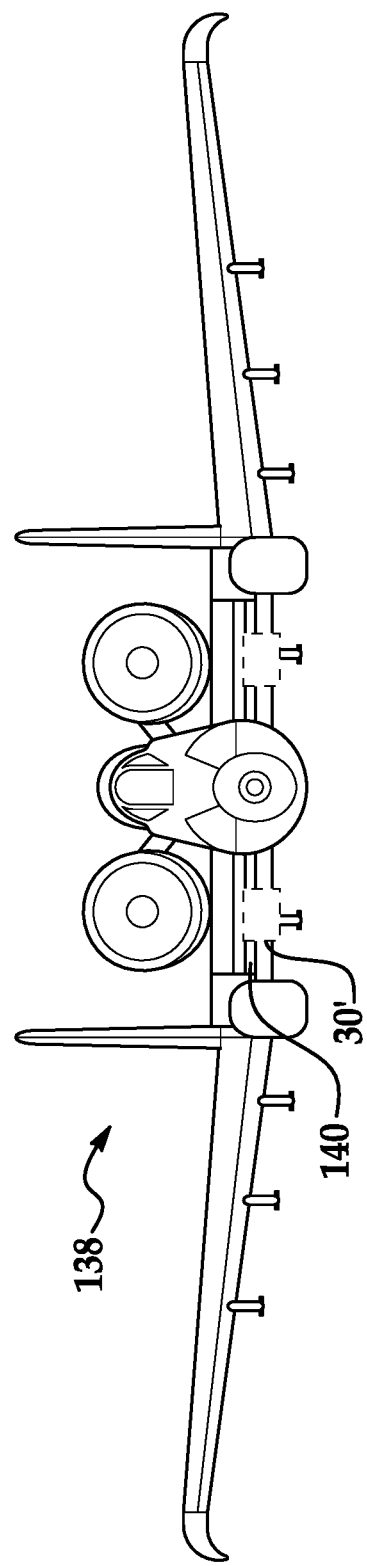
FIG. 19 illustrates an exemplary application or platform in which the exemplary rack assembly shown in FIGS. 9 and 10 may be used with an aircraft.
Figure 20:
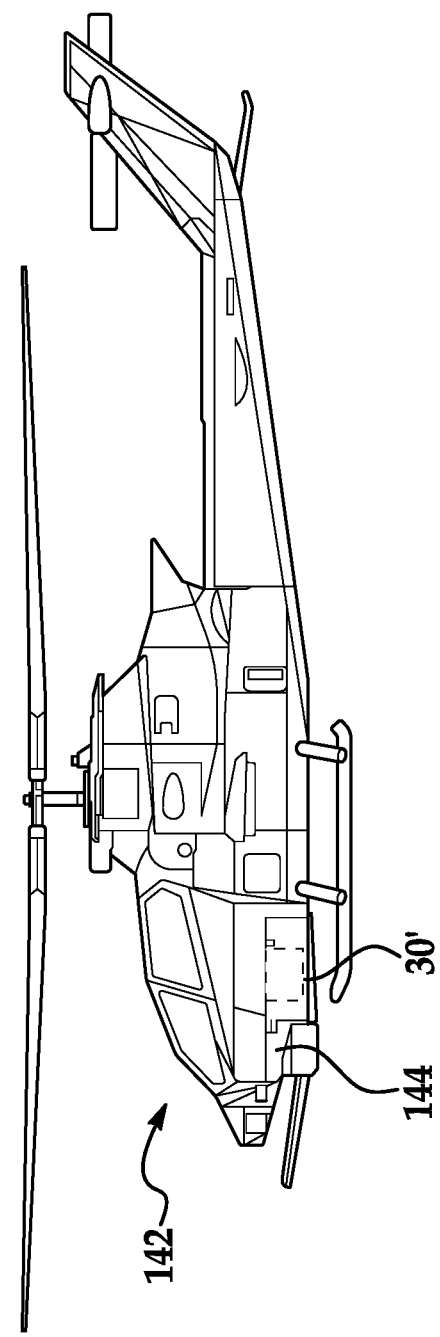
FIG. 20 illustrates another exemplary application or platform in which the exemplary rack assembly shown in FIGS. 9 and 10 may be used with a helicopter.

FIG. 19 shows an aircraft 138 which may be a military aircraft or commercial aircraft. The aircraft 138 includes the rack assembly 30' which may be arranged in a fuselage 140 or airframe of the aircraft 138. The rack assembly 30' may be arranged in a rear location of the fuselage 140 for horizontal launching from the rear of the aircraft 138. FIG. 20 shows a helicopter 142 in which the rack assembly 30' may be arranged in the fuselage 144 of the helicopter 142. The rack 30 may be arranged inside the aircraft 138 or helicopter 142 and aimed at an open door of the aircraft 138 or helicopter 142.

Figure 21:
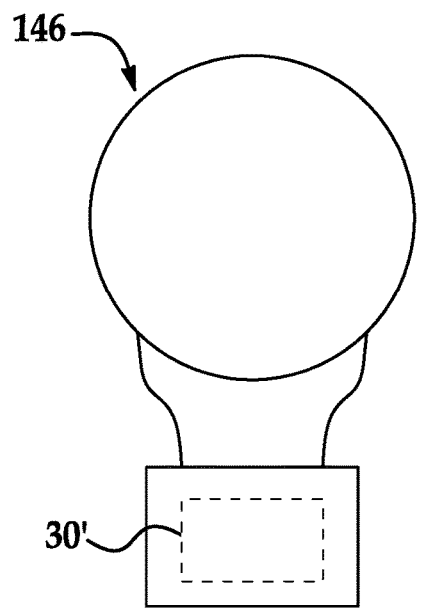
FIG. 21 illustrates another exemplary application or platform in which the exemplary rack assembly shown in FIGS. 9 and 10 may be used with an air balloon.

FIG. 21 shows an aerostat such as a balloon 146 which may carry the rack assembly 30'. In the exemplary applications shown in FIGS. 19-21, suitable payloads that may be carried by the air vehicles include missiles, drones, and any other cargo or non-lethal payloads. Humanitarian payloads may be suitable such that the rack 30 may be used to precisely drop large quantities of medicine, food, and water with precision. Other payloads may be suitable. Stationary platforms, such as aerostats or tall buildings may use the rack assembly 30'. The platform may be configured to release air-to-ground powered and unpowered munitions.

Figure 22:
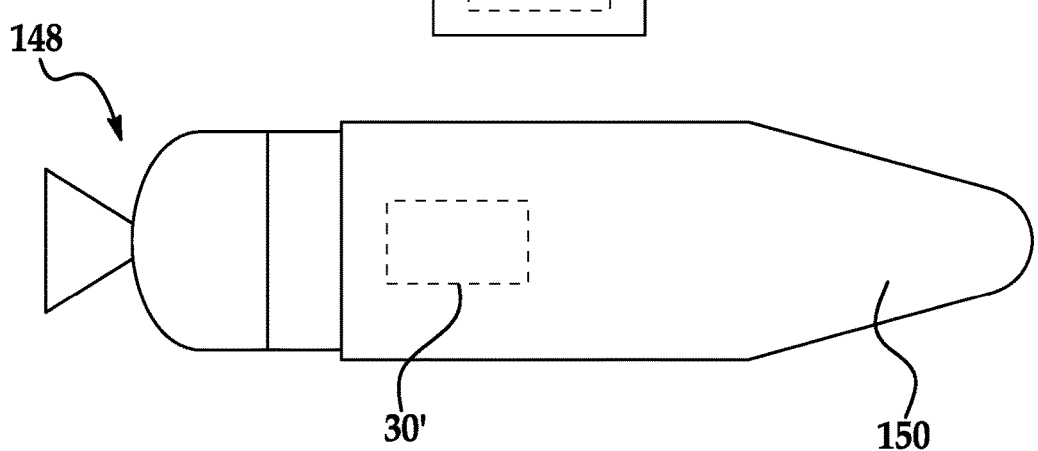
FIG. 22 illustrates another exemplary application or platform in which the exemplary rack assembly shown in FIGS. 9 and 10 may be used with a hypersonic or supersonic vehicle.

FIG. 22 shows a hypersonic or supersonic vehicle 148 or any payload-carrying pod that may include the rack assembly 30' in the main body or radome 150 of the hypersonic vehicle 148. Hypersonic and supersonic platforms can release payloads that will safely clear the near field shock cone. Suitable payloads that may be launched from the hypersonic vehicle 148 include satellites, space probes, or spacecrafts. Other payloads may be suitable. Advantageously, the vehicle 148 may be a spacecraft that releases mini-satellites with a highly-controlled release timing, release vector, and angular momentum.

Figure 23:
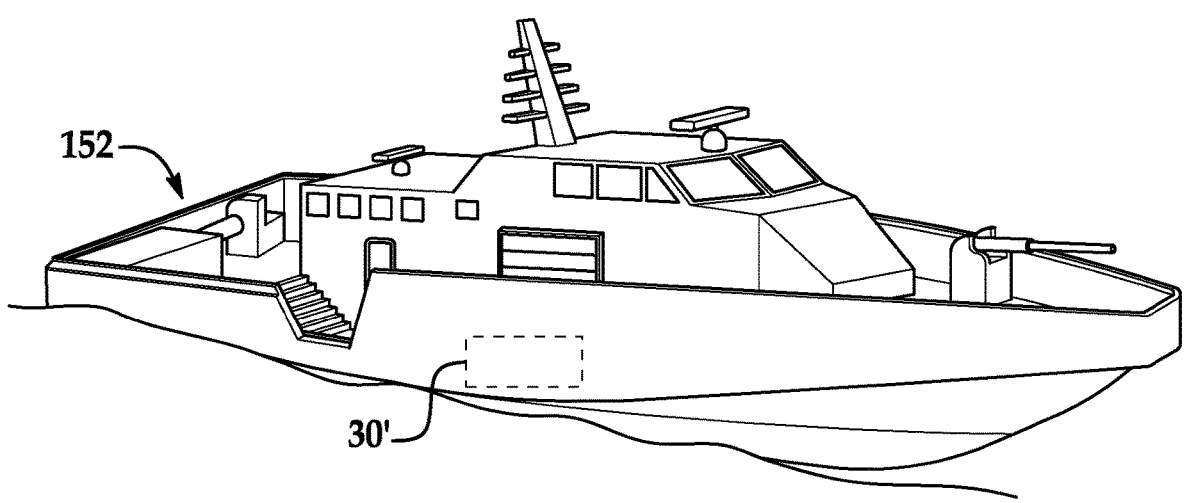
FIG. 23 illustrates another exemplary application or platform in which the exemplary rack assembly shown in FIGS. 9 and 10 may be used with a sea vessel.

FIG. 23 shows a naval vessel 152 which may include the rack assembly 30' in a lower part of the naval vessel 152. The naval vessel 152 may be configured to launch payloads such as torpedoes and other underwater vehicles, such as autonomous underwater vehicles. In an exemplary application, a non-combat ship may be easily converted into a combat ship by arranging the rack assembly 30' for launching payloads from the ship. In exemplary applications, the payloads may be underwater vehicles having imaging and scanning capabilities for a seabed'. Additionally, the rack assembly 30' may be arranged in an underwater vehicle itself for launching a payload from the underwater vehicle. For example, a submarine may include the rack assembly 30' for releasing mini-submarines or underwater drones.

In still other exemplary applications, a land vehicle, such as a truck or military vehicle, may include the rack assembly 30'. The land vehicle may be configured to launch a payload, such as a torpedo, into a body of water. Land vehicles may be configured to release a payload on a bridge or in a tunnel.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rack for launching a payload, the rack comprising: multiple rails that separately engage payload lugs received in respective rails of the multiple rails wherein the multiple rails are parallel and offset from one another in a perpendicular direction relative to a length of the rack; and a force actuator for launching the payload by accelerating the payload along the multiple rails, causing the payload lugs to separate from the respective rails, wherein the force actuator is arranged to exert an accelerating force against one of the payload lugs that accelerates the one of the payload lugs along a corresponding one of the multiple rails thereby carrying the payload along the multiple rails.

2. The rack according to claim 1, wherein the multiple rails are offset by a distance between 2 and 13 centimeters.

3. The rack according to claim 1, wherein the force actuator is in-line with one of the multiple rails and offset relative to another one of the multiple rails.

4. The rack according to claim 1, wherein the multiple rails have a stepped arrangement that ascends along a length of the rack opposite the force actuator.

5. The rack according to claim 1, further comprising a frame having a base, wherein the multiple rails are offset relative to the base and the force actuator is in-line with one of the multiple rails which is farther away from the base relative to another one of the multiple rails.

6. The rack according to claim 1, wherein the multiple rails are vertically offset and the payload is horizontally ejected from the rack.

7. The rack according to claim 1, wherein the multiple rails each have a length that is less than a distance between the payload lugs.

8. The rack according to claim 1, wherein the force actuator includes a telescoping piston and a ramrod that is engaged by the telescoping piston.

9. The rack according to claim 1, wherein the force actuator includes at least one of an electrical actuator, a pneumatic actuator, a hydraulic actuator, or an explosive actuator.

10. The rack according to claim 1 further comprising at least one payload release shoe that is connected between one of the payload lugs and one of the multiple rails, wherein an inertia of the payload causes the payload lug to be released from the at least one payload release shoe.

11. The rack according to claim 10, wherein the at least one payload release shoe includes a blocking piece and a hook that define a lug-retaining recess for the payload lug, the hook being hinged to the blocking piece for opening the lug-retaining recess to release the payload lug.

12. The rack according to claim 11, further comprising a stop shoulder arranged at an end of a length of the rail, wherein the hook is engageable against the stop shoulder and the blocking piece is hinged for pivoting relative to the hook on an opposing side of the stop shoulder.

13. The rack according to claim 10 further comprising a plurality of payload release shoes, wherein each of the multiple rails includes a payload release shoe.

14. A launching system that includes the rack according to claim 1 and further comprises a plurality of racks that are vertically stacked.

15. The launching system according to claim 14 further comprising an electronic control unit that is configured to control each of the racks independently relative to other racks.

16. A rack for launching a payload, the rack comprising:
multiple rails that separately engage payload lugs received in respective rails of the multiple rails;
a force actuator for launching the payload by accelerating the payload along the multiple rails, causing the payload lugs to separate from the respective rails; and
at least one payload release shoe that is connected between one of the payload lugs and one of the multiple rails, wherein an inertia of the payload causes the payload lug to be released from the at least one payload release shoe,
wherein the at least one payload release shoe includes a blocking piece and a hook that define a lug-retaining recess for the payload lug, the hook being hinged to the blocking piece for opening the lug-retaining recess to release the payload lug.

* * * * *